J. DAVIS.
Corn-Planter.
No. 50,915. Patented Nov 14, 1865.
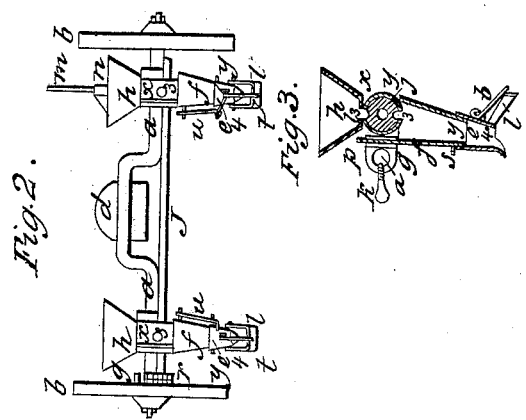
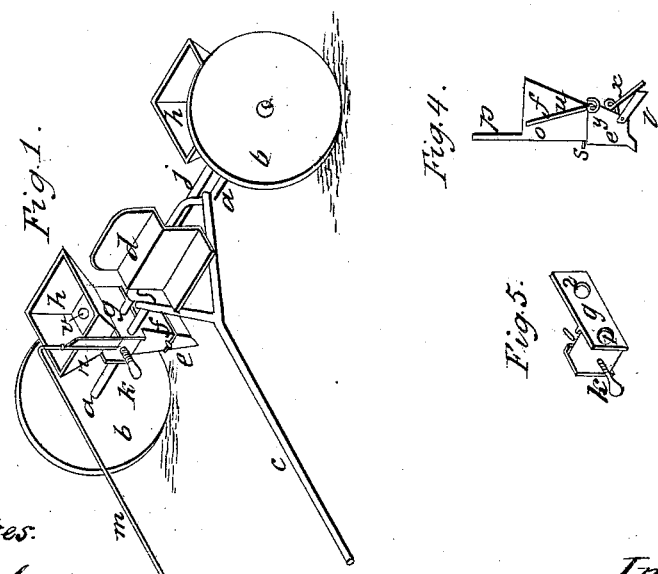
Witnesses:
James J. Johnston
Alexander Hays
Inventor.
John Davis.

UNITED STATES PATENT OFFICE.

JOHN DAVIS, OF ALLEGHENY CITY, PENNSYLVANIA.

IMPROVEMENT IN CORN-PLANTERS.

Specification forming part of Letters Patent No. 50,915, dated November 14, 1865; antedated November 9, 1865.

*To all whom it may concern:*

Be it known that I, JOHN DAVIS, of Allegheny City, in the county of Allegheny and State of Pennsylvania, have invented a new and useful Improvement in Corn-Planters; and I do hereby declare that the following is a full and exact description thereof, reference being had to the accompanying drawings, and to the letters of reference marked thereon.

The nature of my invention consists in an arrangement of the cultivator-teeth, hoppers, feed-rollers, index, and scrapers, the whole being constructed, arranged, and operating in the manner hereinafter described.

To enable others skilled in the art to make and use my invention, I will proceed to describe its construction and operation.

In the accompanying drawings, Figure 1 is a perspective of the planter. Fig. 2 is an end view of the same. Fig. 3 is a sectional view of the hopper, feed-rollers, cultivator-teeth, scrapers, and the pieces to which they are attached. Fig. 4 is a side view of the cultivator-teeth. Fig. 5 is a perspective view of the pieces to which the hoppers and cultivator-teeth are attached, and also support of the shaft of the feed-rollers.

$a$ represents the axle for the wheels $b$. To axle $a$ is attached the tongue $c$.

$d$ represents the seat for the driver. On the axle $a$ are placed the pieces $g g$, which are held in their place by the set-screws $k k$, and may be moved to any point desired on the axle $a$. By this arrangement any desired width between the rows can be obtained in planting.

The pieces $g g$ are furnished with openings 1 and 2 (see Fig. 5) for the axle $a$ and shaft $j$, and also with a slot, $o$, in which are secured the teeth $f f$. On the shaft $j$ are secured the feed-rollers $x x$, which may be moved on the shaft so as to correspond to the position of the pieces $g g$ and the teeth $f f$. On one end of the shaft $j$ is placed a gear-wheel, $r$, which gears into a wheel, $q$, on the wheel $b$. (See Fig. 2.)

The hoppers $h h$ are secured to the pieces $g g$, and to one of the hoppers is secured a piece marked $n$, in which is secured a bent rod, $m$, which serves as an index or pointer. This index or pointer is used as a guide for the driver, the outer end of the index extending out in front of the driver, and is set so as to point directly over the last row made. By this means the driver is enabled to make all other rows in a line parallel with the first two rows made by the planter. It is a fact well known to all persons skilled in the art of planting corn that one of the most difficult things in planting corn is to make the rows parallel with each other, especially so in planters where horses or oxen are used, but this difficulty is entirely overcome by the use of the index.

The cultivator-teeth $f f$ are furnished with an extension-piece, $p$, which is fitted to the slot $o$ in the pieces $g g$ and secured by any known device. By the use of the extension-piece $p$ of the teeth $f f$ they may be raised or lowered so as to get any desired depth of furrow.

The points $e e$ of the teeth are made flexible by making the teeth in two parts and hinging them at $y$. The points $e e$ are held in their proper position by means of springs $u u$, and are prevented from being thrown too far forward by the stop-pin $s$. By this arrangement of the teeth the points will yield to any undue impediment, such as roots, stones, &c., and thereby avoid all undue strain on the planter or any part of it.

On the back part of the points $e e$ are placed scrapers $l l$, which are held down to their work by springs $t t$. The scrapers are secured to the points $e e$ by means of rods 4 4. The feed-rollers $x x$ are covered with sheaths $y' y'$, which are furnished with a number of openings which correspond in form, size, and number to the number, form, and size of the seed-cells in the rollers. The seed cells in the rollers may be of various depths for the purpose of planting different quantities of seed.

By the use of the sheaths all the cells can be covered except those desired for use in planting.

Another advantage obtained by the use of the sheaths is regulating the distance between the hills of corn, which is accomplished by simply changing the position of the sheaths on the rollers.

The operation of my improvement is as follows: Having all things constructed and arranged as herein described and represented, and having set the pieces $g\ g$, with all other parts connected therewith, in the desired position, I then put the seed in the hoppers $h\ h$. I then start the planter, which will cause the wheel $q$ on the wheel $b$ to turn the wheel $r$, which will revolve the shaft $j$ and rollers $x\ x$. The seed will drop through the openings $i\ i$ in the hoppers $h\ h$ down into the seed-cells 3 3, which will carry the seed around and drop it into the teeth $f\ f$, from which it is deposited into the furrows made by the points $e\ e$. The scrapers $l\ l$ then cover up the seed. Having thus completed the first two rows, I then set the index so that it will point directly over the last row made. I then proceed to the planting, driving so that the index shall always point directly over the last row made.

Having thus described the nature, construction, and operation of my improvement, what I claim as of my invention is—

The arrangement of the pieces $g\ g$, hoppers $h\ h$, teeth $f\ f$ with extension $p$, scrapers $l\ l$, shaft $j$, rollers $x\ x$, sheaths $y'\ y'$, wheels $q$ and $r$, and index $m$, the whole being constructed and arranged substantially in the manner herein described, and for the purpose set forth.

JOHN DAVIS.

Witnesses:
    JAMES J. JOHNSTON,
    ALEXANDER HAYS.